United States Patent [19]

Yoshida et al.

[11] 4,002,590
[45] Jan. 11, 1977

[54] COATING COMPOSITION FOR THICK COATING

[75] Inventors: Akitoshi Yoshida, Chiba; Masaharu Kosaka, Ichikawa; Shigeki Inoue, Funabashi, all of Japan

[73] Assignee: Kikusui Kagaku Kogyo Kabushiki Kaisha, Nagoya, Japan

[22] Filed: Nov. 22, 1974

[21] Appl. No.: 526,409

[30] Foreign Application Priority Data

Nov. 27, 1973 Japan .......................... 48-132212

[52] U.S. Cl. .................. 260/29.6 S; 260/29.2 R; 260/29.2 EP; 260/29.4 R; 260/29.4 UA; 260/29.6 MM; 260/29.6 TA; 260/29.7 S
[51] Int. Cl.² .................. C08K 3/00; C08L 25/14
[58] Field of Search .............. 260/29.6 S, 29.6 TA, 260/42.13, 42.54, 29.7 S, 29.4 R, 29.6 MM

[56] References Cited

UNITED STATES PATENTS 3,895,956   7/1975   Yoshida et al. ............... 260/29.6 S

*Primary Examiner*—J. Ziegler

[57] ABSTRACT

A coating composition for thick coating prepared by adding an aggregate to a coating liquid containing 5 to 40% by weight as $SiO_2$ of a coloidal silica and 3 to 40% by weight of dissolved and/or finely dispersed organic polymer, having an $SiO_2/M_2O$ mole ratio (in which M is a monovalent alkali metal atom) of at least 7, and having a viscosity lower than 100 c.p. at 20° C when kept in the sealed state at 50° C for 10 days.

Said coating composition being especially suitable for coating of 1 – 20 kg/m² in thickness and storable for a long period of time with an excellent stability, giving a cured coating having high water resistance, good weather resistance, high adhesive strength and no efflorescence in its surface.

3 Claims, No Drawings

COATING COMPOSITION FOR THICK COATING

BACKGROUND OF THE INVENTION

The present invention relates to a coating composition for forming thick coating in amount of 1 to 20 kg/m$^2$.

In general, coating compositions for thick coating comprise a bonding agent, a dispersant or solvent, an aggregate, a pigment and other adjuvants.

As the bonding agent, there have heretofore been used cements, organic resins, water glasses, silica sols or mixtures thereof. When water glass is used as a bonding agent for a coating composition of this type, efflorescence and reduction of the water resistance are brought about based on the strong alkali of the water glass. Accordingly, use of water glass is not preferred. On the other hand, use of an organic resin as the bonding agent is not preferred from the practical viewpoint because it is expensive, the surface hardness is low in the resulting cured coating and reduction of the water resistance is brought about in some cases. Moreover, in case a silica sol bonding agent is employed, though such advantages as prevention of occurrence of efflorescence and improvement of the water resistance can be attained, no good adhesion is obtained in the coating composition and properties of the coating composition are degraded when it is stored for a long time. Accordingly, use of a silica sol is also not preferred from the practical viewpoint.

Various composite coating liquids have heretofore been proposed as coating liquids to overcome the foregoing defects. For instance, a composite coating liquid comprising water glass, a silica sol and a dispersion of an organic resin was disclosed in laid-opened Japanese Patent Applications No. 43121/72 and No. 23833/73. However, even when such composite coating liquid is used for a coating composition, it is still impossible to prevent occurrence of efflorescence on the coated surfaces and the defects mentioned above with respect to the coating liquid containing a strong alkali cannot be overcome. What is more disadvantageous is that it is very difficult to maintain an applicable viscosity over a long period of storage. Various composite coating liquids comprising a silica sol and a dispersion of an organic resin have heretofore been proposed, but coating compositions prepared from such composite coating liquids are still insufficient in the adhesion strength and the storage stability for a long period of time.

In general, coating compositions include so-called paints, namely coating compositions for thin coating. In these so-called paints, the coating amount is usually 50 to 600 g/m$^2$ and it is about 200 g/m$^2$ in many cases. Accordingly, the problem of sagging is not serious in a coating composition of this type. Further, the solid content is lower than 50% in paints and it is not particularly indispensable to maintain the viscosity at a certain high level for a long period of time. In contrast, in the case of a coating composition for thick coating, one of great objects of which being to hide convexities and concavities on a substrate to be coated, it is important that sagging is effectively prevented and coating composition has such a property that an appropriate pattern can readily be formed on the coating. It is necessary to adjust the coating composition so that a desired pattern can be obtained without sagging while the amount coated is within a range of from 1 kg/m$^2$ to 20 kg/m$^2$, generally from 2 to 5 kg/m$^2$.

SUMMARY OF THE INVENTION

It is a primary object of this invention to provide a coating composition which can give a desired pattern when it is coated in an amount of 1 to 20 kg/m$^2$, the viscosity and coating characteristics of which after long time storage are hardly different from those just after preparation.

Another object of this invention is to provide a coating composition for thick coating which can give a cured coating excellent in the water resistance, the weather resistance and the adhesion strength without causing efflorescence.

In accordance with this invention, there is provided a coating composition for thick coating in an amount of 1 to 20 kg/m$^2$ containing a coating liquid which contains water and/or a hydrophilic organic solvent, a colloidal silica and a dissolved and/or finely dispersed organic polymer, and an aggregate, characterized in that said coating liquid contains 5 to 40% by weight as SiO$_2$ of colloidal silica and 3 to 40% by weight of an organic polymer, has an SiO$_2$/M$_2$ mole ratio (in which M is a monovalent alkali metal atom such as Na, K and Li) of at least 7, and has a viscosity lower than 100 c.p. at 20° C when kept in the sealed state at 50° C for 10 days.

The coating liquid constituting the coating composition of this invention is prepared by using a silica sol having an SiO$_2$/M$_2$O mole ratio of at least 7 and a silica component content of 10 to 50% by weight calculated as SiO$_2$ and including water or a hydrophilic organic solvent as the dispersion medium and an organic polymer dispersion containing at least 3% by weight of an organic polymer and water or a hydrophilic organic solvent as a dispersion medium.

DETAILED DESCRIPTION OF THE INVENTION

The coating liquid having an SiO$_2$ concentration lower than 5% by weight is not preferred for the present invention, because the coating composition including such a coating liquid as above-mentioned readily occurs solidification while storing and forms a cured coating having a poor strength and an insufficient weather resistance. On the other hand, when the SiO$_2$ concentration of the coating liquid exceeds 40% by weight, the storage stability of the coating composition including the coating liquid is extremely poor and gelation often occurs while the coating liquid is subjected to the stability test where it is allowed to stand still at 50° C for 10 days.

The most preferable SiO$_2$ concentration of the coating liquid for the present invention is 7 – 25% by weight.

When the polymer solid concentration is lower than 3% by weight in the coating liquid, the coating composition including the coating liquid is insufficient in the adhesion strength and the stability. On the contrary, when the polymer solid concentration exceeds 40% by weight, a good stability can hardly be obtained. In order for the coating composition to manifest a constant pattern every time it is coated, it is indispensable that the coating composition should be stable for a long time. The monovalent alkali metals such as Na, K, Li etc. may be comprised in the coating liquid used in the present invention while the mole ratio of SiO$_2$/M$_2$O (wherein M represents a monovalent alkali metal atom) in the coating liquid should be higher than 7. The cured coating prepared from the coating composition containing such a coating liquid that the mole ratio of $SiO_2/M_2O$ is lower than 7 exhibits efflorescence in its surface and no good water resistance. The most preferable mole ratio of $SiO_2/M_2O$ is in the range from 7 – 2,000, because coating liquid higher than 5,000 is not so readily obtained, though higher mole ratio is preferred for this invention. The most important requirement for the coating liquid to be used in this invention is that it has a viscosity lower than 100 c.p. at 20° C. when it is kept in the sealed state at 50° C. for 10 days. Only a coating liquid satisfying this requirement can give a coating composition which can be stored for such a long period of time as more than 6 months. A coating composition prepared by using a coating liquid having a viscosity higher than 100 c.p. at 20° C. when it is allowed to stand still at 50° C. for 10 days in the sealed state, can only be stored for 1 month at longest, and during the storage the workability of the coating composition changes gradually followed by the increase of the viscosity, and further, when such coating composition is employed, in order to cope with expected increase of the viscosity, another recipe of the coating composition should be arranged. More specifically, it is necessary to reduce the content of an aggregate or a film-forming assistant, resulting in the lowering of such properties as the adhesion strength, the water resistance and the weather resistance of the cured coating. In the above-mentioned stability test, it is for preventing the change of the concentration by evaporation of the dispersion medium that the coating liquid is kept "in the sealed state." Thus the coating composition prepared by adding aggregate to such a coating liquid as just abovementioned can be stored for a long period of time with the excellent properties unchenged.

As is apparent from the foregoing illustration, the coating liquid to be used for formation of the coating composition of this invention is characterized in that 5 to 40% by weight as $SiO_2$ of a colloidal silica and 3 to 40% by weight as the solids of a finely dispersed polymer component are contained in water or a hydrophilic organic solvent as a dispersion medium, the $SiO_2/M_2O$ mole ratio in the coating liquid is at least 7, and that the coating liquid has a viscosity lower than 100 c.p. when it is allowed to stand still in the sealed state at 50° C. for 10 days. Such coating liquid can easily be prepared by mixing a silica sol containing water or a hydrophilic organic solvent as a dispersion medium and having an $SiO_2/M_2O$ mole ratio of at least 7 and an $SiO_2$ concentration of at least 5% by weight with an organic polymer dispersion containing water or a hydrophilic organic solvent as a dispersion medium and having an organic polymer solid concentration of at least 3% by weight. In order to attain the objects of this invention, it is important to use a coating liquid which has a viscosity lower than 100 c.p. at 20° C when it is allowed to stand still in the sealed state at 50° C. for 10 days. In practice, combinations a silica sol and an organic polymer dispersion which satisfy this stability requirement have been determined in advance, and a suitable combination is chosen depending on the application purpose of the coating composition. Preferred coating liquids can easily be prepared, for example, from an aqueous silica sol having an $SiO_2$ concentration of 35% by weight and an $SiO_2/M_2O$ mole ratio of 180 and an aqueous emulsion of poly(butyl acrylate) or a styrene-butyl acrylate copolymer having a polymer solid concentration of 50% by weight, or from a water-methanol silica sol having an $SiO_2$ concentration of 25% by weight and an $SiO_2/M_2O$ mole ratio of 120 and an aqueous emulsion of an ethylene-vinyl acetate copolymer having a polymer solid concentration of 35% by weight.

The stability of the coating liquid is influenced by the complicated interfacial chemical phenomenon. More specifically, it is construed that the stability of the coating liquid is influenced by such factors as the distribution of silanol groups on the surfaces of colloidal silica particles and the alkali ion concentration in the vicinity of the colloidal silica particles in the silica sol and the degree of cohesion of the dissolved polymer and the interfacial chemical inter-action among dispersed polymer particles or emulsion particles in the polymer dispersion. It is also construed that the interfacial interaction includes a physical repellency or adsorption phenomenon and a chemical reaction. A coating liquid having a viscosity higher than 100 c.p. at the above-mentioned stability test has a property readily to gel and solidify in a short time. Therefore, in such coating liquid, it is impossible to maintain a stable dispersion state for a long period. In contrast, a coating liquid having a viscosity lower than 100 c.p. at the above-mentioned stability test has a high stability to long period storage.

The silica sol to be used for formation of the coating liquid of the coating composition of this invention generally includes water or a hydrophilic organic solvent as a dispersion medium. As specific examples of the dispersion medium, there can be mentioned water, alcohols such as methanol and ethanol, polyols such as glycerin, glycol and polyalkylene glycol, dimethylformamide, ethanolamine, quaternary ammonium hydroxides such as dimethyl diethanol ammonium hydroxide, nitrogen-containing compounds such as morpholine, hydrazine and guanidine, acetone, mixtures of two or more of the foregoing organic solvents and mixtures of such organic solvent with water. When the $SiO_2/M_2O$ mole ratio is lower than 7, the majority of the silica sol forms such a solution as that from water glass to result in high alkali ion concentration. If such silica sol is mixed with an organic resin dispersion to form a coating composition, the resulting composition often gells while it is allowed to stand still at 50° C. for 10 days and hence, the stability to long time storage is very poor.

A higher $SiO_2/M_2O$ mole ratio is more preferred for attaining the objects of this invention. Even when an adjuvant containing a large amount of alkali is added, it is possible to obtain a coating liquid capable of attaining the objects of this invention, as far as the $SiO_2/M_2O$ mole ratio is maintained at a level of at least 7. As such silica sol, there are generally employed, for example, a silica sol having a high $SiO_2/M_2O$ mole ratio, which is prepared by ion exchange method from alkali silicate or peptizing silica gel in alkali, a silica sol obtained by hydrolyzing an alkyl silicate such as ethyl silicate, a silica sol obtained by dissolving metallic silicon in a solution of a quaternary ammonium hydroxide, and the like. Silica sols prepared by hydrolyzing an alkyl silicate or by dissolving metallic silicon in an organic base have an $SiO_2/M_2O$ mole ratio of infinity, because they do not contain an alkali metal ion at all. Accordingly, the range of the $SiO_2/M_2O$ mole ratio in the silica sol to be used for formation of the coating composition of this invention can be expressed as from 7 to infinity. In practice, in view of the manufacturing cost and the availability, it is generally preferred to use a silica sol having a high $SiO_2/M_2O$ mole ratio, which is prepared by the ion exchange method or the peptization method. From the practical viewpoint, it is especially preferred to use a silica sol having an $SiO_2/M_2O$ mole ratio ranging from 7 to about 2000. A silica sol having an $SiO_2/M_2O$ mole ratio exceeding 5000 is extremely difficult to prepare on an industrial scale, and hence, the manufacturing cost becomes high. The silica sol having an $SiO_2/M_2O$ mole ratio of at least 7, that is used for preparation of the coating composition of this invention, has, in general, a pH value ranging from 3 to 12. As such silica sol, there can be mentioned, for example, aqueous silica sol, methanol silica sol, isopropanol silica sol, ethanol silica sol, acetone silica sol, water-methanol silica sol, water-isopropanol silica sol, water-tetraethanol ammonium hydroxide silica sol, and mixtures of two or more of these silica sols. Since it is indispensable that the $SiO_2$ concentration should be 5 to 40% by weight in the coating liquid, it is indispensable that at least 5% by weight as $SiO_2$ of the colloidal silica should be contained in the silica sol. In general, it is preferred that the silica sol has an $SiO_2$ concentration of 10 to 50% by weight.

An organic polymer dispersion or solution to be used for formation of the coating liquid of the coating composition of this invention can be any of organic polymer dispersions customarily used for formation of the usual coating compositions or as coating materials. For example, there can be used a polymer emulsion, a solution of a polymer in water or a water-soluble organic solvent, an aqueous dispersion of a powdery polymer, and the like. It is, however, indispensable that such organic polymer dispersion should have a water resistant film-forming property. It is preferred that the dispersion medium is the same as the dispersion medium used for the silica sol or has properties quite similar to those of the dispersion medium used for the silica sol.

A typical instances of the polymer to be used in this invention, there can be mentioned, polyvinyl acetate, poly(methyl acrylate), poly(butyl acrylate), styrene-butyl acrylate copolymers, vinyl acetate-maleic acid copolymers, urea-formalin resins, melamine-formalin resins, natural rubber, styrene-butadiene copolymer rubbers, acrylonitrile-butadiene, copolymer rubbers, epoxy resins, polyurethane resisns and mixtures thereof.

As specific examples of the organic polymer dispersion to be used for preparation of the coating liquid, there can be mentioned an aqueous emulsion of polyvinyl acetate, an aqueous emulsion of poly(butyl acrylate), an aqueous dispersion of a styrene-butyl acrylate copolymer, an aqueous solution of a urea-formalin precondensate resin, an aqueous emulsion of a urea-melamine-formaline copolycondensate, a styrene-butadiene copolymer rubber latex, an aqueous emulsion of an epoxy resin of the bisphenol A type, and the like.

Since the polymer solids should be contained in an amount of 3 to 40% by weight in the coating liquid, it is indispensable that the organic polymer dispersion should contain at least 3% by weight of the polymer solids.

An aggregate to be used as one constituent of the coating composition of this invention is chosen from mountain sand, river sand, sea sand, rocks, stones, minerals, glass, metals, inorganic solid substances and artificial aggregates. The size of the aggregate is not particularly critical. Namely, an aggregate is optionally chosen from pulverized massive particles, coarse granules, powders and finely divided powders. Further, the form of the aggregate is not particularly critical, and the aggregate can take any of globular, fibrous and rod-like forms. In this invention, it is possible to employ any of aggregates customarily used for coating compositions, such as silica, alumina, calcium carbonate, asbestos, pumice, chamotte powder, vermiculite, white marble, iron oxide, titanium type pigment, chromium type pigment, etc. In addition, plastic powder, wood powder, perlite, micro glass balloon, rock wool and the like can be used singly or in combination of the above-recited aggregates.

Such aggregate is generally incorporated in the coating composition of this invention in an amount of at least 30% by weight, preferably about 40% to about 80% by weight. The content of the aggregate is determined depending on the viscosity of the coating composition, the pattern-manifesting property, the strength of the cured coating and the like.

Any of additives can optionally be incorporated in the coating composition of this invention, as far as attainment of the objects of this invention is not inhibited by incorporation of such additive. As such additive, there can be mentioned, for example, a precipitation-preventing agent such as bentonite, magnesium silicate and clay, a leveling property-improving agent such as an alkali metal salt of polyacrylic acid, an organic polysiloxane emulsion and an ordinary surface active agent, a water repellant such as sodium or potassium alkyl siliconate and an emulsion of a silicone oil in which terminal groups of an organic polysiloxane are converted to hydrophilic groups, a thickener such as sodium or potassium polyacrylate, high-molecular-weight polyethylene oxide, carboxymethyl cellulose and sodium alginate, a crack-preventing agent, and the like.

In preparing the composition of this invention, the order of addition of constituents is not particularly critical. As a method that can be easily practised, there can be mentioned a method comprising feeding liquid components, namely the silica sol and organic polymer dispersion, into a compounding tank provided with an agitator, mixing them in the tank, adding an adjuvant, an aggregate and the like, and agitating the mixture sufficiently to form a homogeneous composition.

The coating composition of this invention is for thick coating of 1 to 20 $kg/m^2$. When the amount coated is smaller than 1 $kg/m^2$, it is impossible to manifest a desired pattern, and when the amount coated is larger than 20 $kg/m^2$, the coating material is consumed in excess and sagging readily occurs. Accordingly, it is not preferred to coat the composition in too small or too large an amount.

The coating composition of this invention can be used for various purposes. For example, it is coated for the purpose of outer or inner decoration on the surface of concrete, slate board, calcium silicate board, gypsum board, plywood board, metal plate or the like. It is also used for protection of the surface of a heat-insulating material, coating of pipes, prevention of water leakage in roof, water protection of construction wall and other construction material, prevention of surface dusting in construction material and reinforcement of various materials.

The coating composition of this invention can be coated according to various customary coating methods such as a spray coating method using a spray gun, a resin coating gun or a gun for mortar, a roller coating method, a method using a curtain flow coater, and the like. A suitable coating method is chosen depending on the purpose of coating.

Compositions of this invention and comparative compositions outside the scope of this invention will now be illustrated in more detail by reference to the following Examples.

Properties of silica sols and organic polymer dispersions used in these Examples are shown in Table 1.

der, calcium carbonate, light weight powder and an organic thickener and agitation was still continued at room temperature for 3 hours in total to obtain a coating composition (a) of the present invention.

Each of three 2l-capacity wide-mouthed polyethylene bottles was charged with 2 kg of the composition (a) prepared just above, and the viscosity was measured at 20° C. after storage of 20 days, 40 days or 60 days. The results are shown in Table 4, from which it is Table 1. Silica Sols and Organic Polymer Dispersion

| Liquid No. | Kind of Liquid | $SiO_2/Na_2O$ Mole Ratio | $SiO_2$ Content (% by weight) | Dispersion Medium | Solid Content (% by weight) |
|---|---|---|---|---|---|
| 1. | silica sol | 180 | 35 | water | — |
| 2. | silica sol | 120 | 25 | water-meOH *1 | — |
| 3. | acrylic emulsion *2 | — | — | water | 50 |
| 4. | acrylic emulsion *3 | — | — | water | 50 |
| 5. | ethylene-vinyl acetate copolymer emulsion *4 | — | — | water | 35 |
| 6. | copolymer resin emulsion *5 | — | — | water | 50 |
| 7. | SBR emulsion *6 | — | — | water | 30 |
| 8. | polyvinyl acetate emulsion | — | — | water | 40 |
| 9. | urea-melamine copolycondensate emulsion *7 | — | — | water | 40 |

*1 mixture of 60% by weight of water and 40% by weight of methanol.
*2 aqueous emulsion of polyacrylate sold and manufactured under tradename "Movinyl 700" by Hoechst.
*3 aqueous emulsion of polyacrylate sold and manufactured under tradename "A-403-2" by Showa Kobunshi.
*4 aqueous emulsion of ethylene-vinyl acetate copolymer sold and manufactured under tradename "P-800" by Showa Kobunshi.
*5 aqueous emulsion of butyl acrylate-methyl acrylate-styrene copolymer sold and manufactured under tradename "Movinyl DM-60" by Hoechst.
*6 aqueous emulsion of styrene-butadiene copolymer rubber.
*7 aqueous emulsion of urea-melamine-formalin precondensate.

EXAMPLE 1

According to the recipe of coating liquid A shown in Table 2, silica sol No. 1 shown in Table 1 was first charged into a 10l-capacity compounding tank equipped with an agitator, then organic polymer dispersion No. 3 shown in Table 1 was added thereto little by little under stirring, and then water was added likewise. The resulting mixture was still continued stirring for 10 minutes to obtain a coating liquid A shown in Table 2. 300 g of the coating liquid A obtained just above was charged into a 500 cc-capacity polyethylene bottle, and next the bottle was completely sealed and was allowed to stand still in a water bath maintained at 50° C. for 10 days. Then, the bottle was taken out of the water bath and naturally cooled. The viscosity of the coating liquid was measured at 20° C. by a viscometer of Brookfield type using the rotor of No. 1 at 60 r.p.m. It was found that the viscosity of the liquid was 41 c.p. The viscosity of the coating liquid A had been similarly measured just after preparation.

According to the recipe of composition (a) shown in Table 3, 2 kg of this coating liquid A was mixed under agitation with bentonite, asbestos powder, silicate powder, calcium carbonate, light weight powder and an organic thickener and agitation was still continued at room temperature for 3 hours in total to obtain a coating composition (a) of the present invention.

apparent that the change of the viscosity was very small. After storage of 20 days and 40 days, the coating compositions (a) was agitated and diluted with water so that the viscosity was reduced to 2600 c.p. The amount of water required for dilution was shown in Table 4. A polybutylacrylate paint was coated on a slate board having a size of 20 mm × 20 mm and a thickness of 6 mm and was dried in air at room temperature for 1 day. The two coating compositions (a), each stored for 20 and 40 days and the viscosity of which were adjusted as mentioned above, was coated in an amount of 2.5 kg/m² on the coated surface of the slate board and the thick-coated board was allowed to stand still at room temperature for 7 days. In order to determine the adhesion strength, a tension was given at a rate of 1 mm/min. at 25° C. in the vertical direction to the coated surface by using a universal Tensilon tensile tester. The connecting fittings of the tester had been bonded to the coated surface and the back surface of the slate board with a two-pack type epoxy resin 1 day before the measurement. The measurement results are shown in Table 4. It was confirmed that the coating compositon (a) had a good storage stability and its adhesion strength was high and was hardly changed for a long time.

Table 2

| | Recipes and Properties of Coating Liquids | | | | | Properties of Coating Liquid | | Viscosity (c.p.) at 20° C. | |
|---|---|---|---|---|---|---|---|---|---|
| | | Compounded Components | | | | | | | |
| | Silica Sol. | | Polymer Dispersion | | Water | | Polymer Solid | Just after | After 10 days' |
| Coating Liquid | No. | Amount (kg) | No. | Amount (kg) | Amount (kg) | $SiO_2$ Content (% by weight) | Content (% by weight) | preparation | storage at 50° C. |
| A | 1 | 2.00 | 3 | 1.00 | 1.00 | 17.5 | 12.5 | 8.2 | 41 |
| B* | 1 | 2.00 | 4 | 1.00 | 1.00 | 17.5 | 12.5 | 7.0 | 3.20* |

Table 2-continued

| | Recipes and Properties of Coating Liquids | | | | Properties of Coating Liquid | | Viscosity (c.p.) at 20° C. | |
|---|---|---|---|---|---|---|---|---|
| | Compounded Components | | | | | Polymer Solid Content (% by weight) | Just after preparation | After 10 days' storage at 50° C. |
| | Silica Sol. | | Polymer Dispersion | Water | | | | |
| Coating Liquid | No. | Amount (kg) | No. | Amount (kg) | Amount (kg) | SiO₂ Content (% by weight) | | | |
| C | 2 | 2.00 | 5 | 0.50 | 1.50 | 10.0 | 4.4 | 15.0 | 80 |
| D* | 2 | 2.00 | 5 | 0.25 | 1.75 | 10.0 | 2.5* | 12.0 | 63 |
| E | 1 | 2.00 | 6 | 1.00 | 1.00 | 17.5 | 12.5 | 20.0 | 31 |
| F | 1 | 2.00 | 7 | 1.00 | 1.00 | 17.5 | 7.5 | 5.4 | 87 |
| G* | 1 | 2.00 | 8 | 1.00 | 1.00 | 17.5 | 10.0 | 6.8 | 480* |
| H* | 1 | 2.00 | 9 | 1.00 | 1.00 | 17.5 | 10.0 | 7.8 | 3000* |

(*) : Outside the scope of the present invention.

Table 3

| Coating Composition | Coating Liquid Kind | Coating Liquid Amount(g) | Organic *1 Thickener (g) | Bentonite (g) | Asbestos Powder(g) | Silica *2 Powder (g) | Calcium *3 Carbonate Powder(g) | Light *4 Weight Powder(g) |
|---|---|---|---|---|---|---|---|---|
| (a) | A | 2000 | 10 | 8 | 20 | 3500 | 5100 | 20 |
| (b) | B | 2000 | 10 | 8 | 20 | 3500 | 4400 | 20 |
| (c) | C | 2000 | 8 | 8 | 20 | 3000 | 5000 | — |
| (d) | D | 2000 | 8 | 8 | 20 | 3000 | 5000 | — |
| (e) | E | 2000 | 10 | 8 | 20 | 3500 | 5100 | 20 |
| (f) | F | 2000 | 10 | 8 | 20 | 3500 | 5100 | 20 |
| (g) | G | 2000 | 10 | 8 | 20 | 3500 | 5100 | 20 |
| (h) | H | 2000 | 10 | 8 | 20 | 3500 | 5100 | 20 |

*1: sodium polyacrylate
*2: 95% passable through 325 mesh
*3: 100% passable through 325 mesh
*4: perlite

Table 4

| | Properties of Coating Compositions | | | | | | | |
|---|---|---|---|---|---|---|---|---|
| | Viscosity (c.p.) at 20° C. | | | | Amount(%) of added water* | | Adhesion Strength (kg/cm²) | |
| Coating Composition | Just after preparation | After 20 days | After 40 days | After 60 days | After 20 days | After 40 days | After 20 days | After 40 days |
| (a) | 3200 | 3100 | 3400 | 3800 | 15 | 25 | 6.4 | 6.2 |
| (b) | 2900 | 70000 | gelled | — | 60 | 170 | 1.2 | 0.3 |
| (c) | 2500 | 2900 | 2800 | 3100 | 15 | 20 | 7.2 | 6.3 |
| (d) | 2700 | 2900 | 2800 | 3200 | 20 | 40 | 1.0 | 0.8 |

(*): amount of water necessary to adjust the viscosity to 2600 c.p. (% based on coating composition).

EXAMPLE 2

A coating liquid C shown in Table 2 was prepared in the same manner as in Example 1 by using silica sol No. 2 and polymer dispersion No. 5 shown in Table 1. When the coating liquid was subjected to the stability test in the same manner as in Example 1, the viscosity was 80 c.p. A coating composition (c) shown in Table 3 was prepared in the same manner as in Example 1 by using this coating liquid.

When the coating composition was stored for a long time under the same conditions as in Example 1, the change of the viscosity was very small as shown in Table 4. When the adhesion strength to a slate board was tested in the same manner as in Example 1 with respect to the coating compositions which had been allowed to stand still for 20 days and 40 days and the viscosity of which were adjusted as in Example 1, the composition (c) had a good stability and a high adhesion strength as shown in Table 4 even after long period storage. The coating composition (c), after allowed to stand still for 40 days, was coated on a slate board, then dried at room temperature for 7 days. Though the board was dipped in boiling water for 30 minutes, neither peeling of the coating nor dusting on the surface of the coating was observed. After this boiling water-treated coating was dried in air at room temperature for 1 day, the pencil hardness was measured. It was found that it had a pencil hardness of 2H. Thus, it was confirmed that a sufficient hardness was maintained in the coating and the coating has a high water resistance.

EXAMPLE 3

A coating liquid E shown in Table 2 was prepared in the same manner as in Example 1 by using silica sol No. 1 and polymer dispersion No. 6 shown in Table 1. When the coating liquid E was subjected to the stability test, the viscosity was 31 c.p. Then, a coating composition (e) shown in Table 3 was prepared in the same manner as in Example 1 by using this coating liquid E. When this coating composition was allowed to stand still at room temperature for 40 days, a slight phase separation was observed, but it was made homogeneous by agitation. The viscosity of the coating composition (e) could be adjusted to 3000 c.p. by adding a small amount of water under agitation. A poly(butyl acrylate) paint having a solid content of 25% was coated on a slate board having a thickness of 3 mm by a brush and dried in air for 1 day. The coating composition (e) having its viscosity adjusted to 3000 c.p. was coated on the so obtained coated board in an amount of 1.7 kg/m² by means of a roller coater. A coating of a uniform pattern was obtained on the entire surface of the board.

EXAMPLE 4

A coating liquid F shown in Table 2 was prepared in the same manner as in Example 1 by using silica sol No. 1 and polymer dispersion No. 7 shown in Table 1. When this coating liquid was subjected to the stability test, the viscosity was 87 c.p. A coating composition (f) was prepared in the same manner as in Example 1 by using the coating liquid F. Even after the coating composition (f) was allowed to stand still for 40 days at room temperature, it was made homogeneous by agitation, and the viscosity could be adjusted to 3000 c.p. by addition of only 1% of water. When the coating composition was subjected to the slate board coating test in the same manner as in Example 3, it was found that the coating composition had a good extendable property, and it gave a uniform pattern.

EXAMPLE 5

A coating composition (a) was prepared in the same manner as in Example 1, and after it was stored for 40 days at room temperature, the viscosity was adjusted to 2600 c.p. and the coating test was conducted in the following manner. A poly(butyl acrylate) paint having a solid content of 25% was coated on a cement mortar plate by a brush, and the above coating composition was sprayed on the coated plate under a pump pressure of 4.3 kg/cm$^2$ by using a lithin coating gun while the coated amount of the coating composition was varied as shown in Table 5. The state of the coating just after spraying was examined, and the coating was dried at room temperature for 7 days and subjected to the water resistance test by dipping it in boiling water for 30 minutes. The results are shown in Table 5, from which it will readily be understood that when the coating composition was thickly coated in an amount of 1.5 to 5 kg/m$^2$, a good coating having an excellent water resistance was obtained, but when it was thinly coated in an amount of 0.3 and 0.6 kg/m$^2$, good coatings were not obtained.

(b) was prepared in the same manner as in Example 1 by using this coating liquid B. The viscosity of the as-prepared composition was 2900 c.p. at 20° C but it changed to increase the viscosity up to 70000 c.p. after 20 days' storage, and further to form a gel after 40 days' storage. Further, such a large amount of water as shown in Table 4 was required to adjust the viscosity of the coating composition (b) to 2600 c.p. after 20 days' and 40 days' standing. When the adhesion strength to a slate board was tested in the same manner as in Example 1 by using the coating compositions (b), the viscosity of which were thus adjusted after 20 days' and 40 days' standing, the adhesion strength were very low as shown in Table 4, and it was confirmed that the coating composition (b) had no practical utility when it was sotred for a long period of time.

EXAMPLE 7 (Comparison 2)

A coating liquid D shown in Table 2 was prepared in the same manner as in Example 1 by using slica sol No. 2 and polymer dispersion No. 5 shown in Table 1. The polymer solid content was 2.5% by weight in the resulting coating liquid. A coating composition (d) shown in Table 3 was prepared in the same manner as in Example 1 by using this coating liquid D. The resulting coating composition had a good storage stability. After the coating compositions (d) were allowed to stand still for 20 and 40 days, the viscosity was adjusted in the same manner as in Example 1, and then the coating compositions were subjected to the adhesion test to a slate boards in the same manner as in Example 1. Only such a low adhesion strength as shown in Table 4 was obtained, and hence, it was confirmed that this coating composition had no practical utility.

EXAMPLE 8 (Comparison 3)

A coating liquid G shown in Table 2 was prepared in the same manner as in Example 1 by using silica sol No. 1 and polymer dispersion No. 8 shown in Table 1. When the coating liquid was subjected to the stability test, the viscosity was 480 c.p. A coating composition (g) was prepared in the same manner as in Example 1

Table 5

| | Coating Test Results | | | |
|---|---|---|---|---|
| | | | Hardness of Coating* | |
| Amount Coated (kg/m$^2$) | State of Coating | Water Resistance Test | Before water resistance test | After water resistance test |
| 0.3 | not uniform and substrate was partly disclosed | partly peeled | 3B | lower than 6B |
| 0.6 | " | " | 2B | " |
| 1.5 | beautiful pattern was obtained | not peeled and unchanged | H | HB |
| 2.5 | " | " | 2H | HB |
| 4.0 | convex and concave pattern of thick coating was formed | " | 2H | H |
| 5.0 | " | " | 2H | H |

*according to the pencil hardness test for paints.

EXAMPLE 6 (Comparison 1)

A coating liquid B shown in Table 2 was prepared in the same manner as in Example 1 by using silica sol No. 1 and polymer dispersion No. 4 shown in Table 1. When the coating liquid was subjected to the stability test, the viscosity was 320 c.p. A coating composition by using this coating liquid G. When this coating composition was allowed to stand at room temperature for 40 days, increase of the viscosity was extreme. The viscosity of the coating composition which had been allowed to stand still for 40 days was adjusted to 3000 c.p. by addition of water and the composition was subjected to the coating test in the same manner as in Example 3. A pattern was narrowly manifested, but the hardness of the dried coating was low and dusting was readily caused on the coating surface.

EXAMPLE 9 (Comparison 4)

A coating liquid H shown in Table 2 was prepared in the same manner as in Example 1 by using silica sol No. 1 and polymer dispersion No. 9 shown in Table 1. When the coating liquid was subjected to the stability test, the viscosity was 300 c.p. A coating composition (h) shown in Table 3 was prepared in the same manner as in Example 1 by using the coating liquid H. When this composition was allowed to stand still at room temperature for 30 days, it gelled, and even when water was added thereto, no coating composition usable for spray coating was obtained.

What is claimed is:

1. A coating composition for thick coating in an amount of from 1 to 20 kg/m² comprising a coating liquid containing water, aqueous silica sol, an aqueous dispersion of butyl acrylate-methyl acrylate-styrene copolymer and an aggregate, wherein said coating liquid contains from 5 to 40% by weight as $SiO_2$ of colloidal silica, 3 to 40% by weight of said copolymer, a $SiO_2/M_2O$ mole ratio, wherein M is an alkali metal atom selected from the group consisting of Na, K, and Li, of from 7 to 2000 and has a viscosity lower than 100 c.p. at 20° C when kept in a sealed state at 50° C for 10 days.

2. A coating composition according to claim 1 wherein the coaing liquid contains from 7 to 25% by weight of $SiO_2$ of colloidal silica.

3. A coating compositon according to claim 1 wherein said coating liquid contains 10% by weight as $SiO_2$ of colloidal silica, 4.4% by weight of butyl acrylate-methyl acrylate-styrene copolymer, an $SiO_2/Na_2O$ mole ratio of 120 and has a viscosity of 80 c.p. at 20° C when kept in a sealed state at 50° C for 10 days.

* * * * *